Patented Sept. 29, 1925.

1,555,086

UNITED STATES PATENT OFFICE.

CLARENCE B. TILTON AND MILTON F. BEECHER, OF WORCESTER, MASSACHUSETTS, ASSIGNORS TO NORTON COMPANY, OF WORCESTER, MASSACHUSETTS, A CORPORATION OF MASSACHUSETTS.

ARTICLE OF SILICATE BONDED GRANULES.

No Drawing.   Application filed December 15, 1920.   Serial No. 431,011.

*To all whom it may concern:*

Be it known that we, CLARENCE B. TILTON and MILTON F. BEECHER, citizens of the United States of America, residing at Worcester, in the county of Worcester and State of Massachusetts, have invented certain new and useful Improvements in Articles of Silicate Bonded Granules, of which the following is a full, clear, and exact specification.

This invention relates to articles of silicate bonded granules, and more particularly to abrasive articles and non-slip tiles.

The methods heretofore utilized for making silicate bonded articles, such as grinding wheels, have comprised mixing granular material with sodium silicate solution in sufficient amount to form a plastic mass, tamping this mass in a mold, drying it and thereafter firing it at a suitable temperature to harden the bond. This procedure has been slow and expensive since it involved a preliminary heating operation to dry the article before firing could be effected, as otherwise too rapid heating would cause a puffing or swelling of the wheel and so produce an unusable structure. It was also impossible to add sufficient silicate to the mixture to produce as hard a grade of wheel as desired, since the mixture had to be of such plasticity as to be workable. Hence, there has been a noticeable gap in grades between the old silicate type of wheel and those made from vitrified bonded material.

It is accordingly an object of our invention to overcome these difficulties and to provide a simpler and more economical procedure for manufacturing silicate wheels than heretofore found feasible, which may be utilized to produce wheels much harder than those obtained by the method described above and which will provide an open-structured wheel of cool cutting qualities capable of use for grinding either with water or in a dry condition, and which will be highly serviceable in this art. Further objects will be readily apparent in the following disclosure.

In accordance with our invention, we propose to form a bonded article, such as a grinding wheel or a non-slip tile, from a mixture of granules of abrasive material with a dry sodium silicate and to form a plastic or workable body thereof by the aid of a temporary bonding medium which preferably will be driven out in the subsequent firing operation. We furthermore may form the bond of a mixture of the dry silicate with ceramic materials which may have their fusion points lowered by the silicate serving as a flux, so that the process of vitrification of the wheel may start at a range of temperatures below those of the ceramic materials taken alone. These fluxable bonding materials may comprise various siliceous substances, such as flint, or clays which, by the aid of the silicate flux, can have their maturing temperatures lowered to within the firing range of the ordinary ceramic kilns but which need not necessarily be brought to a state of quiet fusion by such heat treatment. The various types of viscous temporary binders capable of holding these grains and dry bond together during the moulding and heating operations and of burning out during firing comprise such substances as gum tragacanth, glucose or glycerine.

As one application of this invention, we may form a grinding wheel of abrasive materials, such as silicon carbide or the numerous types of crystalline alumina now used for abrasives, comprising emery, corundum or various brands of electrically fused alumina, by incorporating therewith the dry sodium silicate in a suitable powdered condition and mixing the same with gum tragacanth in sufficient amount to give the desired workable properties to the mass. These ingredients may be employed in the ratio of one part of silicate to eight parts of abrasive. The mixture after being tamped in a mould is quickly heated for several hours at a temperature of from 850° C. to 1000° C. until the silicate has become fused to a glass or the bond has properly matured.

As a specific example of a bonded article made up of alumina abrasive and silicate fluxed clay materials, the following ingredients and approximate proportions may be specified:

| | Per cent by weight. |
|---|---|
| Alumina abrasive granules | 80 |
| Dry sodium silicate | 10 |
| Feldspar | 3 |
| Slip clay | 3 |
| Stoneware clay | 3 |

Gum tragacanth (3% solution) sufficient to make the mixture workable.

It is obvious that the kinds of the ingredients and their proportions may be varied within wide limits for either type of bonded article, as one skilled in the art will readily understand, to fit the requirements and depending on the type and size of grain employed and the bond strength desired.

These materials may be similarly formed into shaped articles by the simple operations of mixing the dry ingredients and thereafter incorporating the temporary binder with the same. This mixture is tamped in a suitable mould to a hard condition, after which the object is heated in a ceramic kiln without any preliminary drying operation to a temperature sufficient to mature the bond, varying between 850° C. and 1,000° C., for a period of several hours depending on the size of the article.

In accordance with this invention, we provide a bonded article in which abrasive granules are bonded into an open porous structure of a hard grade by vitreous materials fused at a temperature below that of the ordinary vitrified grinding wheel firing operation.

By this method, we cut the time of heating the green article approximately in half and render this operation easier to control, and largely obviate the danger of producing an imperfect structure, due to the fact that it is not necessary to dry out the large percentage of moisture which would be found in a wheel made up of a liquid sodium silicate mixture. Moreover, we are enabled to heat the wheel rapidly without a slow preliminary drying operation, the rate at which temperature of firing may be raised depending only on the capacity of the article itself to absorb the heat without cracking during the maturing operation. As a result, we may produce a series of grinding wheels of different grades or bond strengths which has a wider range of utility than similar articles made by the old methods.

Having thus described our invention, what we claim as new and desire to secure by Letters Patent is:

1. The method of making an article of bonded abrasive grains comprising the steps of mixing said grains with dry sodium silicate and a temporary viscous binder and thereafter heat treating a formed mass of said ingredients at a temperature between 850° C. and 1000° C., to fuse the bond into intimate contact with said granules.

2. The method of making an article of bonded abrasive grains comprising the steps of mixing said grains with dry sodium silicate in powdered form and a plastic, vitrifiable ceramic material proportioned to form a temporarily workable mass and a permanent bond, shaping an article therefrom and thereafter firing the shaped article without a preliminary drying operation at a temperature in excess of 850° C. to mature the bond.

3. The method of making an article of bonded abrasive grains comprising mixing the abrasive grains with dry sodium silicate and a clay material, incorporating a temporary viscous binder therewith to form a workable mass, shaping the same into an article of desired form and heat treating the same to flux the silicate and clay mixture and mature it into a vitrified mass which will bond said grains together.

4. The method of making a bonded article comprising mixing granules of abrasive with powdered sodium silicate and vitrifiable clay materials adapted to be fluxed by said silicate at a temperature of about 850° C. to about 1000° C., incorporating a viscous temporary binder therewith to produce a moldable mass, tamping the ingredients into a mould and thereafter heating the formed article rapidly to a temperature between 850° C. and 1000° C. and maintaining the heat treatment to flux the bonding materials and produce a vitrified article.

5. The method of making a bonded article comprising the steps of mixing abrasive grains with a vitrifiable ceramic material and dry sodium silicate flux proportioned to bond said grains, and a viscous temporary combustible binder capable of developing the desired plasticity in the mass, shaping an article therefrom and then without a preliminary drying operation firing the mass to remove said binder and vitrify the bond mixture.

6. The method of making an article of bonded abrasive grains comprising mixing the abrasive grains with a ceramic material and a dry sodium silicate adapted to lower the temperature of vitrification of the ceramic material and modify the grade of the bonded article, incorporating a temporary viscous binder so that the mass will maintain any desired form, and thereafter appropriately heating to bond the abrasive grains.

7. The method of making an article of bonded abrasive grains comprising mixing the abrasive grains with a vitrifiable clay material and a dry sodium silicate adapted to modify the grade of a bonded article, incorporating a temporary viscous binder so the mass will maintain any desired form, and thereafter appropriately heating to a temperature of from about 850° C. to about 1000° C. to bond the abrasive grains.

8. The method of making a bonded article comprising mixing abrasive grains with a vitrifiable clay material and a dry sodium silicate in amount sufficient to modify the grade of the bonded article, incorporating a temporary viscous binder so the mass will maintain any desired form, and thereafter appropriately heating without a preliminary drying operation to a temperature from about 850° C. to about 1000° C. to bond the abrasive grains.

Signed at Worcester, Massachusetts, this 11th day of Dec. 1920.

CLARENCE B. TILTON.
MILTON F. BEECHER.